(12) United States Patent
Kozinski et al.

(10) Patent No.: US 11,982,447 B2
(45) Date of Patent: May 14, 2024

(54) APPLIANCE CONTROL PANEL LIGHTING SYSTEM

(71) Applicant: Haier US Appliance Solutions, Inc., Wilmington, DE (US)

(72) Inventors: Kyle Andrew Kozinski, Louisville, KY (US); Andrew Justice, Louisville, KY (US); Jennifer Alford, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 187 days.

(21) Appl. No.: 17/536,261

(22) Filed: Nov. 29, 2021

(65) Prior Publication Data

US 2023/0167978 A1  Jun. 1, 2023

(51) Int. Cl.
*F24C 15/06* (2006.01)
*F21V 8/00* (2006.01)

(52) U.S. Cl.
CPC ............ *F24C 15/06* (2013.01); *G02B 6/0008* (2013.01)

(58) Field of Classification Search
CPC .............................. G02B 6/0008; F24C 15/06
See application file for complete search history.

(56) References Cited

U.S. PATENT DOCUMENTS

| | | | |
|---|---|---|---|
| 5,701,235 A | 12/1997 | Hagemeyer Cook | |
| 5,836,669 A * | 11/1998 | Hed | F24C 15/008 362/621 |
| 6,877,329 B2 * | 4/2005 | Bassi | F25D 27/00 62/264 |
| 7,355,164 B2 * | 4/2008 | Arnold | H03K 17/9631 250/221 |
| 7,845,809 B2 * | 12/2010 | Busing | A47L 15/4293 362/89 |
| 9,709,284 B2 * | 7/2017 | Bach | F24C 7/086 |
| 10,228,146 B2 | 3/2019 | Zenker | |
| 10,877,260 B2 * | 12/2020 | Kang | A61B 1/00048 |
| 11,608,978 B2 * | 3/2023 | Lee | F21V 33/0044 |
| 11,684,147 B2 * | 6/2023 | Tamminga | A46B 15/0036 15/22.2 |
| 2007/0054230 A1 * | 3/2007 | Brezniak | A61C 7/14 433/29 |
| 2019/0344063 A1 * | 11/2019 | Collias | A61M 37/0076 |

FOREIGN PATENT DOCUMENTS

| | | |
|---|---|---|
| CN | 207118013 U | 3/2018 |
| EP | 0944147 B1 | 7/2010 |

* cited by examiner

*Primary Examiner* — Arman B Fallahkhair
(74) *Attorney, Agent, or Firm* — Dority & Manning, P.A.

(57) ABSTRACT

An appliance includes a cabinet and a user interface. The user interface includes an illuminable indicator. The appliance also includes a circuit board with an LED mounted on the circuit board. The appliance further includes a flexible light guide extending from the LED to the illuminable indicator. The flexible light guide provides optical communication from the LED to the illuminable indicator, such that the LED is operable to illuminate the illuminable indicator when the LED is activated.

20 Claims, 15 Drawing Sheets

APPLIANCE CONTROL PANEL LIGHTING SYSTEM

FIELD OF THE INVENTION

The subject matter of the present disclosure relates generally to indicator lights, such as may be used in control panels for appliances.

BACKGROUND OF THE INVENTION

Appliances generally include a control panel having a plurality of buttons, keys, or other input devices. Utilizing the control panel, an appliance user can input control commands to the appliance and operate the appliance. Certain control panels include a plurality of indicator lights to provide visual information about the status of the appliance, such as selected cycles or options input by the user.

Oven appliances generally include a cabinet that defines a cooking chamber for cooking food items therein, such as by baking or broiling the food items. To heat the cooking chamber for cooking, oven appliances include one or more heating elements positioned at a top portion, a bottom portion, or both the top portion and the bottom portion of the cooking chamber. Some oven appliances also include a convection heating element and fan for convection cooking cycles. The heating element or elements may be used for various cycles of the oven appliance, such as a preheat cycle, a cooking cycle, or a self-cleaning cycle.

The control panel or user interface of the oven appliance is typically located at or near the top of the oven appliance. Thus, indicator lights and associated electronics which may be included in or connected to the user interface of an oven appliance tend to be exposed to residual convective heat from the cooking chamber. Such heat may prove deleterious to the electronics.

Accordingly, an appliance, such as an oven appliance, that includes features for promoting flexibility in locating electronic components of a user interface therein would be desirable.

BRIEF DESCRIPTION OF THE INVENTION

Aspects and advantages of the invention will be set forth in part in the following description, may be apparent from the description, or may be learned through practice of the invention.

In one exemplary embodiment, an appliance is provided. The appliance includes a cabinet and a user interface disposed on a front side of the cabinet. The user interface includes an illuminable indicator mounted to an external surface of the user interface. The appliance also includes a circuit board with an LED mounted on the circuit board. The appliance further includes a flexible light guide extending from the LED to the illuminable indicator. The flexible light guide provides optical communication from the LED to the illuminable indicator, such that the LED is operable to illuminate the illuminable indicator when the LED is activated.

In another exemplary embodiment, an appliance is provided. The appliance includes a cabinet and a user interface. The user interface includes an illuminable indicator. The appliance also includes a circuit board with an LED mounted on the circuit board. The appliance further includes a flexible light guide extending from the LED to the illuminable indicator. The flexible light guide provides optical communication from the LED to the illuminable indicator, such that the LED is operable to illuminate the illuminable indicator when the LED is activated.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
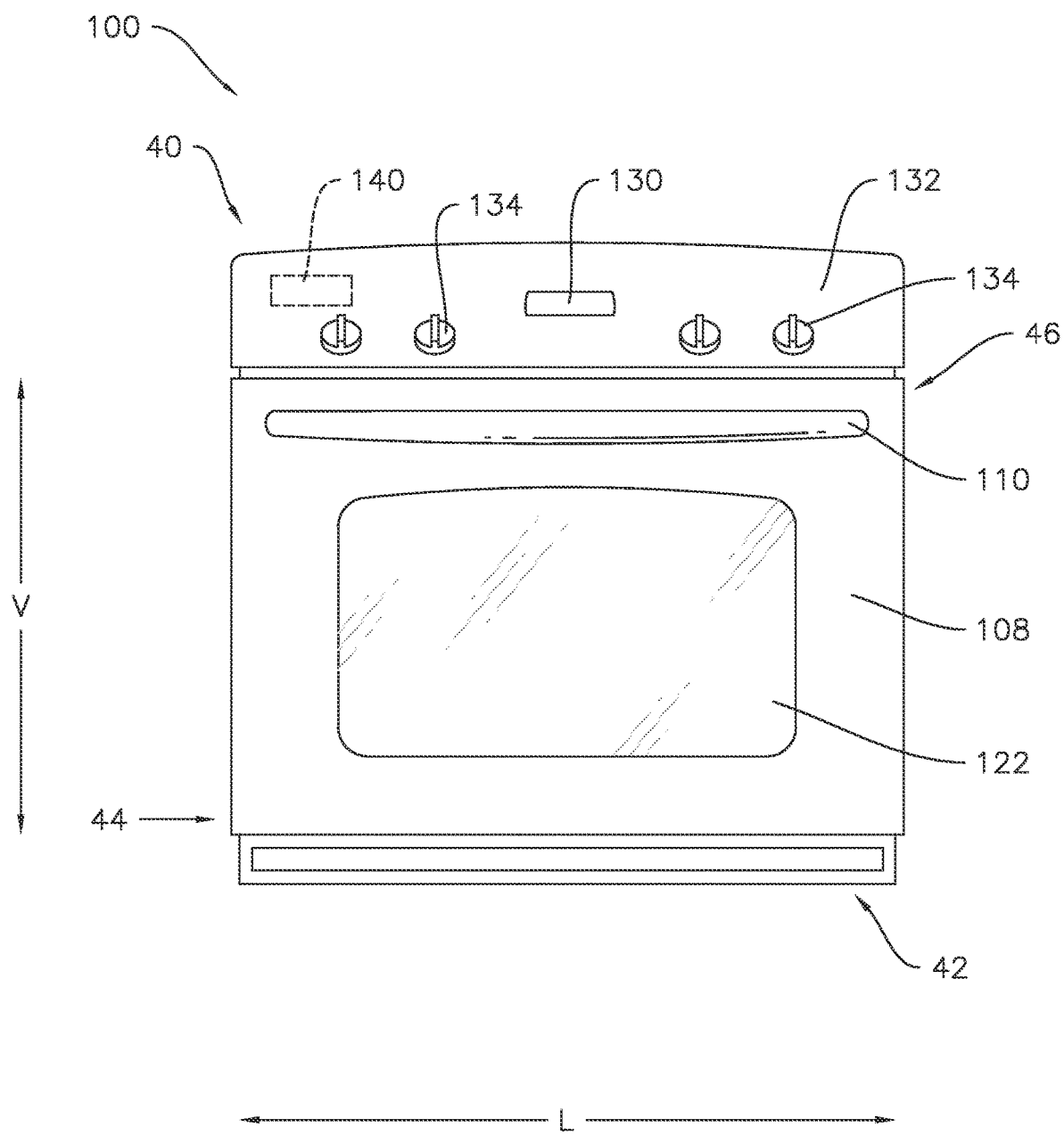
FIG. 1 provides a front view of an exemplary oven appliance according to one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. In the context of an angle or direction, such terms include values within ten degrees of the stated direction. For example, "generally vertical" includes directions within ten degrees of vertical in any direction, e.g., clockwise or counter-clockwise.

Figure 2:
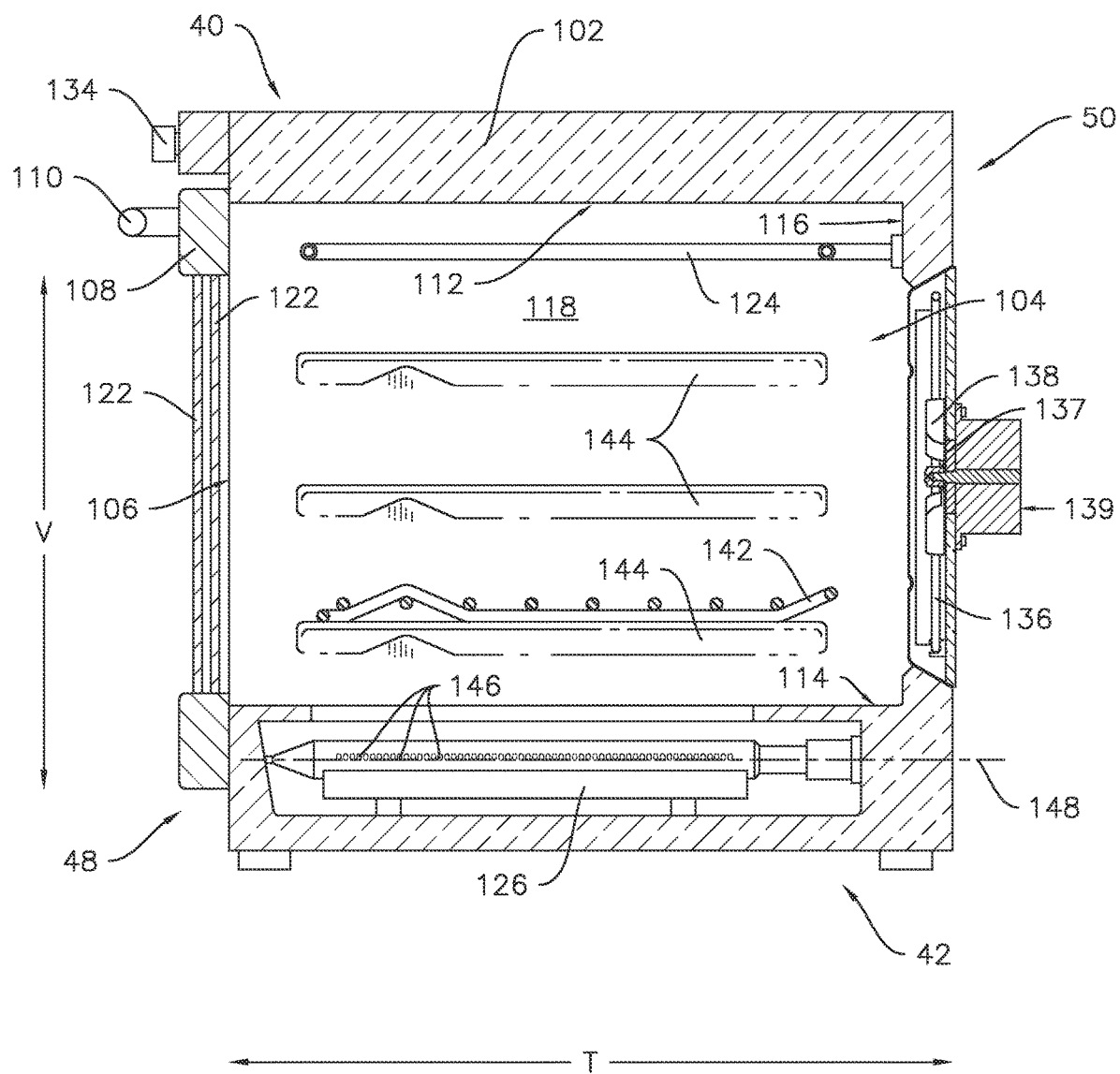
FIG. 2 provides a side section view of the oven appliance of FIG. 1.

FIGS. 1 and 2 illustrate an oven appliance 100 according to an exemplary embodiment of the present subject matter. Oven appliance 100 includes an insulated cabinet 102 which defines a vertical direction V, a lateral direction L, and a transverse direction T. The vertical, lateral, and transverse directions V, L, and T are mutually perpendicular and form an orthogonal direction system. Cabinet 102 extends between a top portion 40 and a bottom portion 42 along the vertical direction V. Cabinet 102 extends between a left side 44 and a right side 46 along the lateral direction L and between a front portion 48 and a back portion 50 along the transverse direction T.

Still referring to FIGS. 1 and 2, for this exemplary embodiment, oven appliance 100 includes an insulated cabinet 102 with an interior cooking chamber 104 defined by a top wall 112, a floor or bottom wall 114, a back wall 116, and a pair of opposing side walls 118. Cooking chamber 104 is configured for the receipt of one or more food items to be cooked. Oven appliance 100 includes a door 108 pivotally mounted to cabinet 102 at the opening 106 of cabinet 102 to permit selective access to cooking chamber 104 through opening 106. A handle 110 is mounted to door 108 and assists a user with opening and closing door 108. For example, a user can pull on handle 110 to open or close door 108 and access cooking chamber 104.

Oven appliance 100 can include a seal (not shown) between door 108 and cabinet 102 that assists with maintaining heat and cooking vapors within cooking chamber 104 when door 108 is closed as shown in FIGS. 1 and 2. Multiple parallel glass panes 122 provide for viewing the contents of cooking chamber 104 when door 108 is closed and assist with insulating cooking chamber 104. A baking rack 142 is positioned in cooking chamber 104 for the receipt of food items or utensils containing food items. Baking rack 142 is slidably received onto embossed ribs or sliding rails 144 such that rack 142 may be conveniently moved into and out of cooking chamber 104 when door 108 is open.

One or more heating elements may be included at the top, bottom, or both of cooking chamber 104 to provide heat to cooking chamber 104 for cooking. Such heating element(s) can be gas, electric, microwave, or a combination thereof. For example, in the embodiment shown in FIG. 2, oven appliance 100 includes a top heating element 124 which, in the illustrated example embodiment is an electric resistance heating element 124, and a bake heating element or bottom heating element 126, which, in the illustrated example embodiment of FIG. 2 is a gas burner 126, and bottom heating element 126 is positioned adjacent to and below bottom wall 114.

In the illustrated example embodiment, oven appliance 100 also has a convection heating element 136 and convection fan 138 positioned adjacent back wall 116 of cooking chamber 104. Convection fan 138 is powered by a convection fan motor 139. Further, convection fan 138 can be a variable speed fan—meaning the speed of fan 138 may be controlled or set anywhere between and including, e.g., zero and one hundred percent (0%-100%). In certain embodiments, oven appliance 100 may also include a bidirectional triode thyristor (not shown), i.e., a triode for alternating current (TRIAC), to regulate the operation of convection fan 138 such that the speed of fan 138 may be adjusted during operation of oven appliance 100. The speed of convection fan 138 can be determined by controller 140. In addition, a sensor 137 such as, e.g., a rotary encoder, a Hall effect sensor, or the like, may be included at the base of fan 138, for example, between fan 138 and motor 139 as shown in the exemplary embodiment of FIG. 2, to sense the speed of fan 138. The speed of fan 138 may be measured in, e.g., revolutions per minute ("RPM"). In some embodiments, the convection fan 138 may be configured to rotate in two directions, e.g., a first direction of rotation and a second direction of rotation opposing the first direction of rotation. For example, in some embodiments, reversing the direction of rotation, e.g., from the first direction to the second direction or vice versa, may still direct air from the back of the cavity. As another example, in some embodiments reversing the direction results in air being directed from the top and/or sides of the cavity rather than the back of the cavity. Additionally, the convection heating features are optional and are shown and described herein solely by way of example. In additional embodiments, the oven appliance 100 may include different convection heating features or may not include convection heating features at all.

In various embodiments, more than one convection heater, e.g., more than one convection heating elements 136 and/or convection fans 138, may be provided. In such embodiments, the number of convection fans and convection heaters may be the same or may differ, e.g., more than one convection heating element 136 may be associated with a single convection fan 138. Similarly, more than one top heating element 124 and/or more than one bottom heating element 126 may be provided in various combinations, e.g., one top heating element 124 with two or more bottom heating elements 126, two or more bottom heating elements 126 with no top heating element 124, etc.

Oven appliance 100 includes a user interface 132 (which may also be referred to as a control panel) having a display 130 positioned thereon and having a variety of controls 134. Interface 132 allows the user to select various options for the operation of oven 100 including, e.g., various cooking and cleaning cycles. Operation of oven appliance 100 can be regulated by a controller 140 that is operatively coupled to, i.e., in communication with, user interface 132, heating elements 124, 126, and other components of oven 100 as will be further described.

For example, in response to user manipulation of the user interface 132, controller 140 can operate the heating element(s). Controller 140 can receive measurements from one or more temperature sensors (not shown) which are in or in thermal communication with the cooking chamber 104. Controller 140 may also provide information such as a status indicator, e.g., a temperature indication, to the user with display 130. Controller 140 can also be provided with other features as will be further described herein.

Controller 140 may include a memory and one or more processing devices such as microprocessors, CPUs, or the like, such as general or special purpose microprocessors operable to execute programming instructions or microcontrol code associated with operation of oven appliance 100. The memory may represent random access memory such as DRAM or read only memory such as ROM or FLASH. In one embodiment, the processor executes programming instructions stored in memory. The memory may be a separate component from the processor or may be included onboard within the processor. The memory can store information accessible by the processor(s), including instructions that can be executed by processor(s). For example, the instructions can be software or any set of instructions that when executed by the processor(s), cause the processor(s) to perform operations. For the embodiment depicted, the instructions may include a software package configured to operate the system, e.g., to execute exemplary methods of operating the oven appliance 100. Controller 140 may also be or include the capabilities of either a proportional (P), proportional-integral (PI), or proportional-integral-derivative (PID) control for feedback-based control implemented with, e.g., temperature feedback from one or more sensors such as temperature sensors and/or probes, etc.

Controller 140 may be positioned in a variety of locations throughout oven appliance 100. In the illustrated embodiment, controller 140 is located next to user interface 132. In other embodiments, controller 140 may be located under or next to the user interface 132, or at any other appropriate location with respect to oven appliance 100. Generally, controller 140 will be positioned within the cabinet 102. In the embodiment illustrated in FIG. 1, input/output ("I/O") signals are routed between controller 140 and various operational components of oven appliance 100 such as heating elements 124, 126, 136, convection fan 138, controls 134, display 130, alarms, and/or other components as may be provided. In one embodiment, user interface 132 may represent a general purpose I/O ("GPIO") device or functional block.

Although shown with knob type controls 134 in FIG. 1, it should be understood that controls 134 and the configuration of oven appliance 100 shown in FIG. 1 is provided by way of example only. More specifically, user interface 132 may include various input components, such as one or more of a variety of electrical, mechanical, or electro-mechanical input devices including rotary dials, push buttons, a touchscreen, and touch pads, etc., among other possible examples and combinations. User interface 132 may include other display components, such as a digital or analog display device designed to provide operational feedback to a user. User interface 132 may be in communication with controller 140 via one or more signal lines or shared communication busses.

While oven 100 is shown as a wall oven, the present invention could also be used with other cooking appliances such as, e.g., a stand-alone oven, an oven with a stove-top, or other configurations of such ovens. Numerous variations in the oven configuration are possible within the scope of the present subject matter. For example, variations in the type and/or layout of the controls 134, as mentioned above, are possible. As another example, the oven appliance 100 may include multiple doors 108 instead of or in addition to the single door 108 illustrated. Such examples include a dual cavity oven, a French door oven, and others. As still another example, one or more of the illustrated heating elements may be substituted with microwave heating elements, or any other suitable heating elements. The examples described herein are provided by way of illustration only and without limitation.

Referring specifically to FIG. 2, it may be seen that the gas burner (which is an embodiment of a lower or bottom heating element 126) defines a generally cylindrical shape with a longitudinal axis 148 extending therethrough. The gas burner 126 also includes a plurality of ports 146 defined therein, e.g., in one or more linear arrays on one or more sides of the gas burner 126. As will be recognized and understood by those of ordinary skill in the art, the ports 146 orient and direct combustion products, e.g., flames and heated gases, from the gas burner 126, e.g., to or towards the cooking chamber 104. In the example embodiment illustrated in FIG. 2, the gas burner 126 is oriented generally along the transverse direction T, e.g., the longitudinal axis 148 of the gas burner 126 is parallel to or within ten degrees of the transverse direction T. In additional embodiments, the lower heating element may be any suitable heating element, such as any one of various types of radiant heating elements, e.g., an electric resistance heating element.

Figure 3:
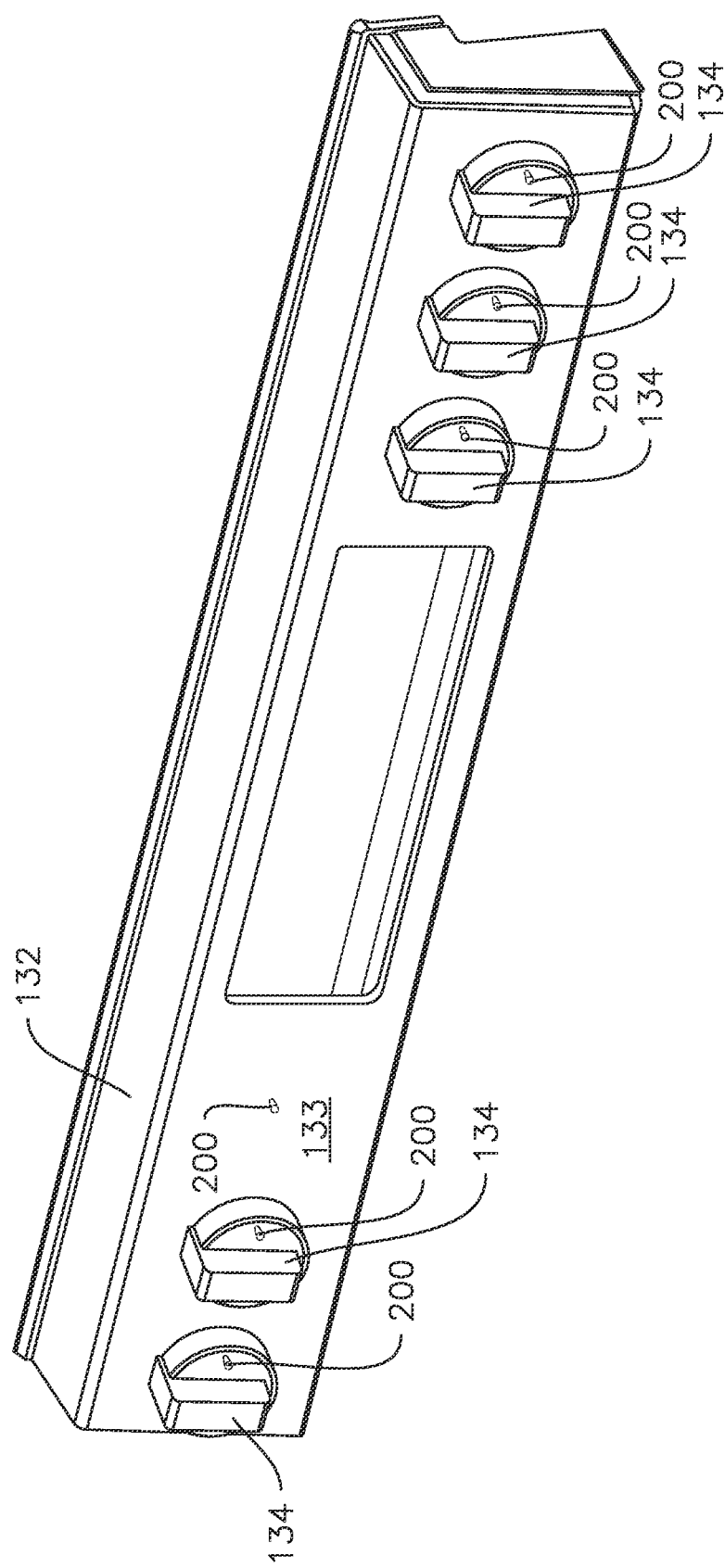
FIG. 3 provides a front perspective view of a user interface according to one or more embodiments of the present subject matter which may be incorporated into an appliance such as the oven appliance of FIG. 1.

FIG. 3 provides a perspective view of an exemplary user interface 132 which may be incorporated into an appliance, such as the exemplary oven appliance 100 illustrated in FIGS. 1 and 2. The user interface 132 may be positioned or disposed on, e.g., a front side (such as at the front portion 48) of the cabinet 102 of the appliance. As illustrated in FIG. 3, the user interface 132 may include one or more illuminable indicators 200. The illuminable indicator(s) 200 may be mounted to an external surface 133 of the user interface 132, such as within and/or outside of a footprint of each control, e.g., each knob 134.

Figure 4:
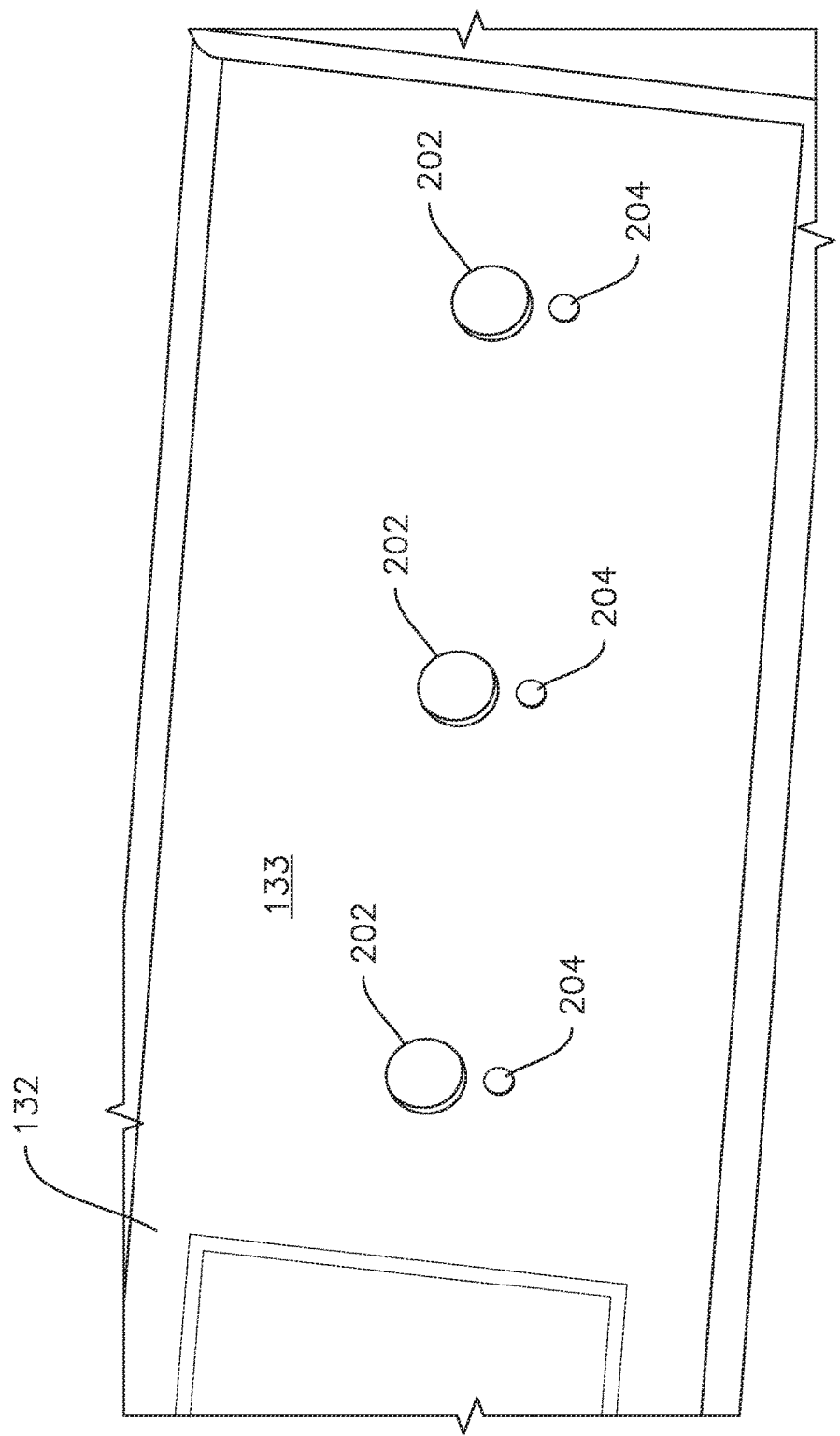
FIG. 4 provides an enlarged view of a portion of the user interface of FIG. 3.

FIG. 4 provides an enlarged perspective view of a portion of the user interface 132 of FIG. 3 in isolation, e.g., without the controls 134 or the illuminable indicator(s) 200. As may be seen in FIG. 4, the user interface 132 may include a plurality of apertures extending therethrough, such as matched pairs of apertures including one for each control 134 and a corresponding aperture for each illuminable indicator 200 associated with the control 134. For example, the user interface 132 may include a plurality of control apertures 202 and a plurality of indicator apertures 204. The apertures 202, 204 may be provided in a one-to-one correspondence, e.g., one indicator aperture 204 for each control aperture 202 and each indicator aperture 204 corresponding to one of the control apertures 202. In other embodiments, each control aperture 202 may have an indicator aperture 204 associated therewith, while one or more of the indicator apertures 204 may be freestanding, e.g., spaced apart from the control apertures 202. As will be described in more detail below, the controls 134, e.g., knobs 134, may be mounted on or coupled to a rotary shaft 135 (FIG. 13) of an input 150. For example, the shaft 135 may be a valve stem and the input 150 may be a valve in embodiments where the oven appliance 100 includes a gas burner heating element, or the rotary shaft may be an electrical device and the input 150 may vary electrical power, e.g., current or voltage, provided to an electric element in embodiments where the oven appliance 100 includes an induction heating element and/or an electrical resistance heating element.

Figure 5:
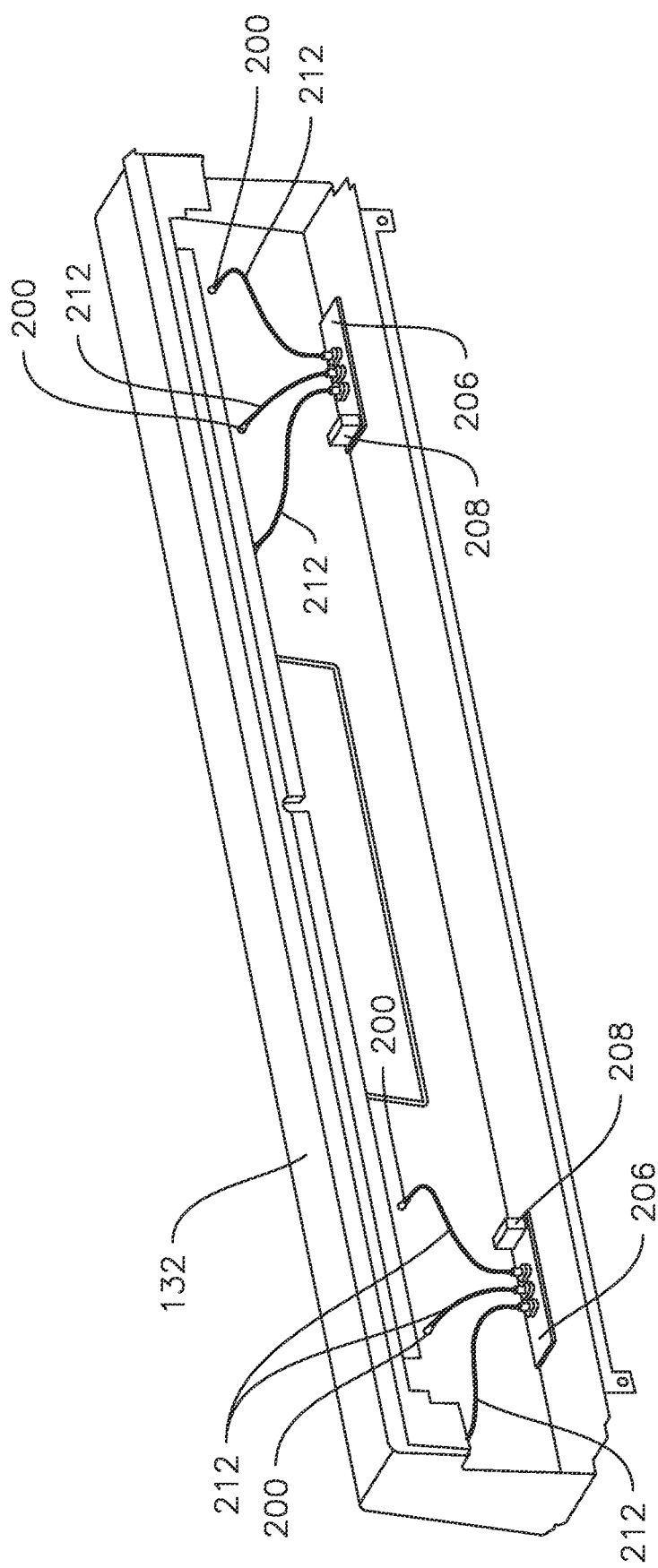
FIG. 5 provides a back perspective view of an exemplary embodiment of the user interface of FIG. 3.

In some embodiments, the appliance may include one or more circuit boards 206, e.g., two circuit boards 206 as illustrated in FIG. 5, where each circuit board 206 is connected to a sub-group of the illuminable indicators 200. As will be recognized by those of ordinary skill in the art, each circuit board 206 includes a power/signal module 208 thereon. In some embodiments, e.g., as illustrated in FIG. 5, each circuit board 206 corresponds to one side, e.g., one half, of the user interface 132. In particular, as illustrated in FIG. 5, the user interface 132 may include six illuminable indicators 200 and each circuit board 206 may be coupled to three of the illuminable indicators 200.

Figure 6:
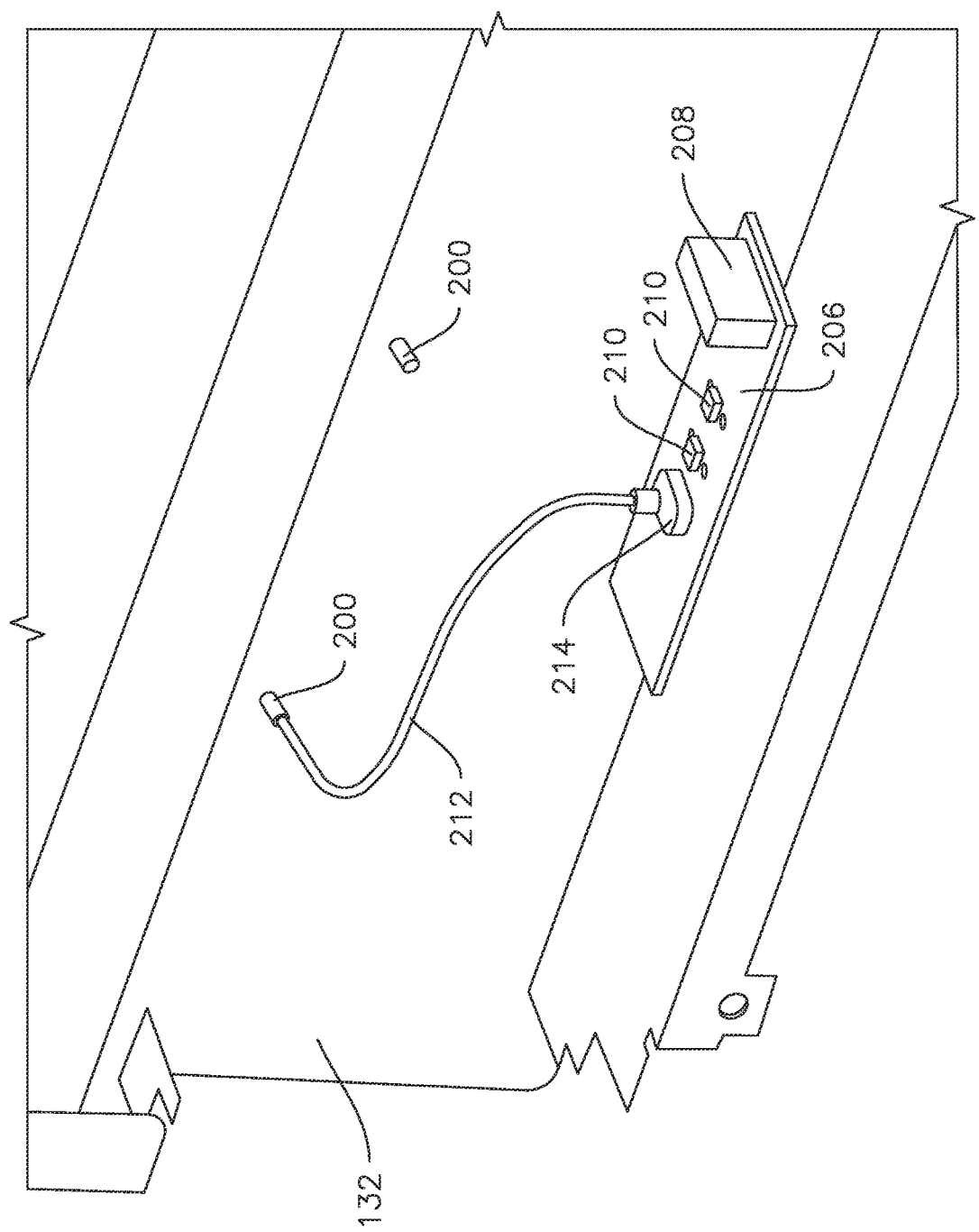
FIG. 6 provides an enlarged view of portions of the user interface of FIG. 5.

FIG. 6 illustrates an exemplary circuit board 206, e.g., which may be one of the two circuit boards 206 for a user interface 132 as illustrated in FIG. 5. For example, the circuit board 206 may have three LEDs 210 mounted thereon. As depicted in FIG. 6, one of the three LEDs 210 is surrounded by a shroud 214 of a flexible light guide 212. The shroud 214 is mounted to the circuit board 206 over and around the LED 210 (the specific LED 210 surrounded by the shroud 214 is not visible in FIG. 6 because it is obscured by the shroud 214), whereby the LED 210 is fully enclosed by and between the shroud 214 and the circuit board 206. Thus, the LED 210 within the shroud 214 is optically isolated from the adjacent LEDs 210 (the adjacent LED 210 being visible in FIG. 6, the respective shrouds 214 of the flexible light guides 212 for the remaining LEDs 210 are not illustrated in FIG. 6 in order to more clearly depict the relative positioning of the LEDs 210 on the circuit board 206).

As illustrated for example in FIG. 6, the flexible light guide 212 extends from one of the LEDs 210 (the particular LED 210 which is optically coupled to the illuminable indicator 200 by the flexible light guide 212 in FIG. 6 is not visible itself, as noted above) to a corresponding illuminable indicator 200, e.g., in at least some embodiments, the corresponding illuminable indicator 200 is a corresponding one indicator of a plurality of illuminable indicators 200. For example, a second illuminable indicator 200 is also depicted in FIG. 6 which corresponds to one of the LEDs 210 and the flexible light guide 212 extending therebetween is omitted to more clearly illustrate the LED 210 and the illuminable indicator, e.g., lens, 200.

In various embodiments, the or each flexible light guide 212 includes a shroud 214 at a first end thereof and extends from the shroud 214 to a second end directly contacting and coupled to the illuminable indicator 200. As mentioned above, the illuminable indicator 200 may be or include a lens, e.g., which is positioned and configured to focus and/or direct light from the corresponding LED 210 to towards the front of the user interface 132. In various embodiments, the illuminable indicator 200 may be comprised, in whole or in part, of one or more transparent and/or translucent materials, whereby the indicator 200 transmits light from the flexible light guide 212, e.g., light originating from the LED 210 within the shroud 214 of the flexible light guide 212, to the front of the user interface 132, e.g., at a front surface, e.g., the external surface 133, of the user interface 132, and/or to illuminate a portion of the indicator 200 that is visible from the front surface 133, e.g., by a user with generally average vision within a six feet or less of the front of the appliance, e.g., the oven appliance 100. As will be described in more detail below, the flexible light guide 212 may include one or more optical fibers. Thus, the flexible light guide 212 is flexible and not rigid at least in that at least a portion 220 of the flexible light guide, such as the optical fiber portion, can bend, e.g., with a bend angle up to and including about 160° when the unbent segments of the flexible light guide adjacent to the bend are coplanar, without breaking, e.g., without cracking or crazing, and without distorting or attenuating a light signal carried or transmitted by and through the flexible light guide 212, e.g., the optical fiber(s) therein. The flexible light guide 212 may also be flexible to a greater degree, e.g., the fiber portion 220 of the flexible light guide 212 may also be flexible in that the fiber portion 220 can be coiled, e.g., formed or bent into a spiral shape with at least one complete turn in the spiral shape. Also by way of example, the fiber portion 220 of the flexible light guide 212 may be flexible in that the fiber portion 220 can bend so as to form a bend radius of at least ten times the diameter of the fiber. For example, a 2 mm diameter fiber may have a bend radius of 20 mm or greater, a 0.5 mm diameter fiber may have a bend radius of 5 mm or greater, etc.

Figure 7:
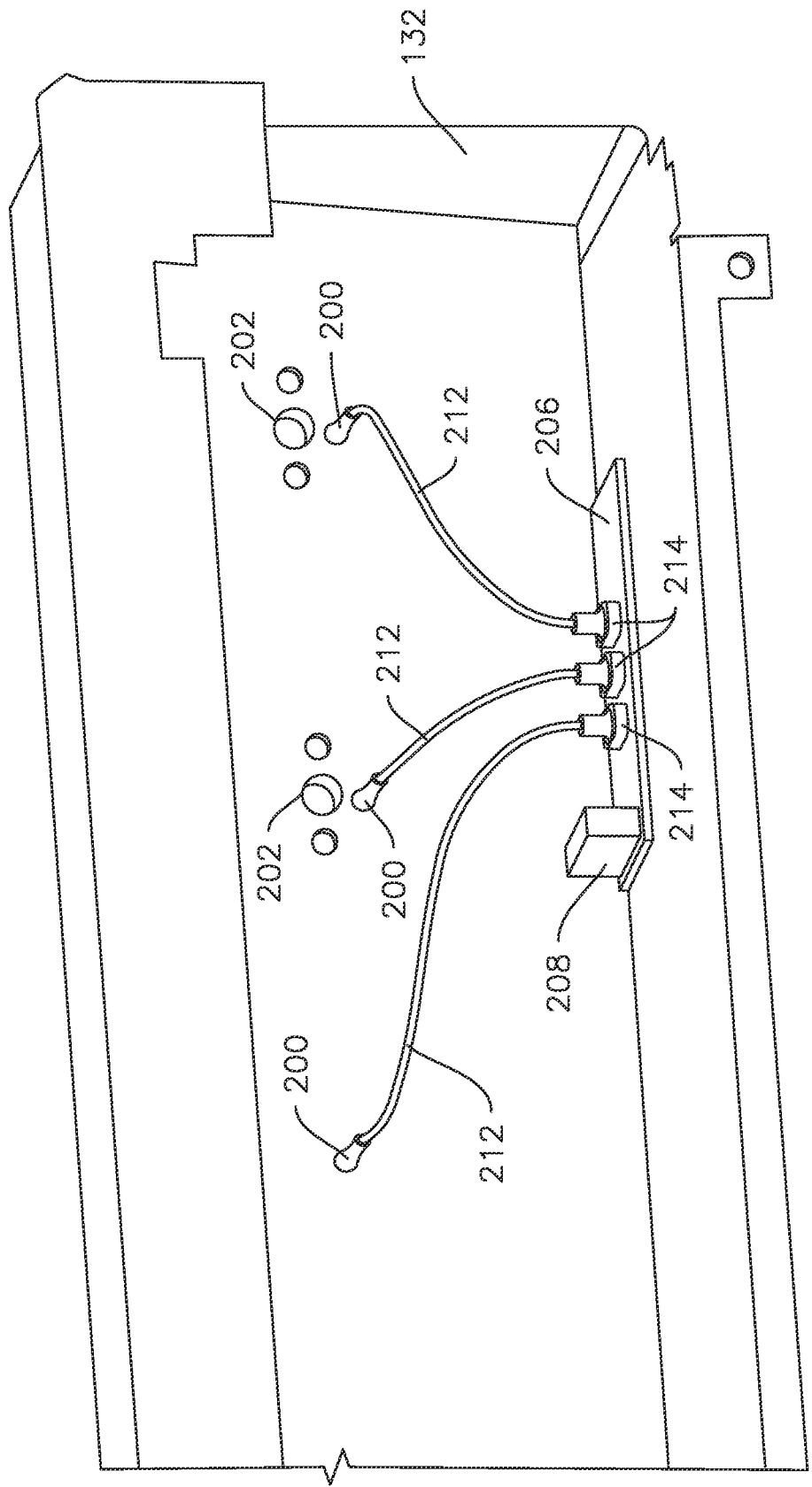
FIG. 7 provides an enlarged view of portions of the user interface of FIG. 5.

FIG. 7 depicts another exemplary circuit board 206 with three LEDs 210 mounted thereon and three flexible light guides 212 coupled to the three LEDs 210. The shroud 214 of each flexible light guide 212 is mounted to the circuit board 206 surrounding each corresponding LED 210. As illustrated for example in FIG. 7, two of the three LEDs 210 and the illuminable indicators 200 coupled thereto via the flexible light guides 212 correspond with one of the controls, e.g., knobs 134, while the third illuminable indicator 200 and the third LED 210 coupled thereto via the third flexible light guide 212 is not associated with a specific control. For example, the center indicator 200 and the right indicator 200 as shown on the page in FIG. 7 are each proximate to a control aperture 202 and spaced apart from the control aperture 202 by a center-to-center distance that is within a footprint, e.g., less than a radius in the case of a circular control such as a knob 134, of the control. In various embodiments, an illuminable indicator 200 may be spaced apart from a center of an associated control by a distance that is within the footprint of the control or is outside of the footprint of the control by less than seventy-five percent of the footprint. For example, in the case of a circular knob 134 as mentioned above, the illuminable indicator 200 associated with a particular knob 134 may be spaced apart from the center of the knob 134 and/or the center of the control aperture 202 through which the knob 134 is coupled to an internal input (such as a valve, etc., as discussed above) by a distance of less than or equal to the radius of the knob 134 (in which case the illuminable indicator 200 is within the footprint of the knob 14) or by a distance greater than the radius of the knob 134 by up to seventy-five percent of the radius of the knob 134. Thus, returning again to the particular example illustrated in FIG. 7, the illuminable indicator 200 on the left of the page is not associated with a control, e.g., as may be seen by the center-to-center distance between the left illuminable indicator 200 and the nearest control aperture 202.

Figure 8:
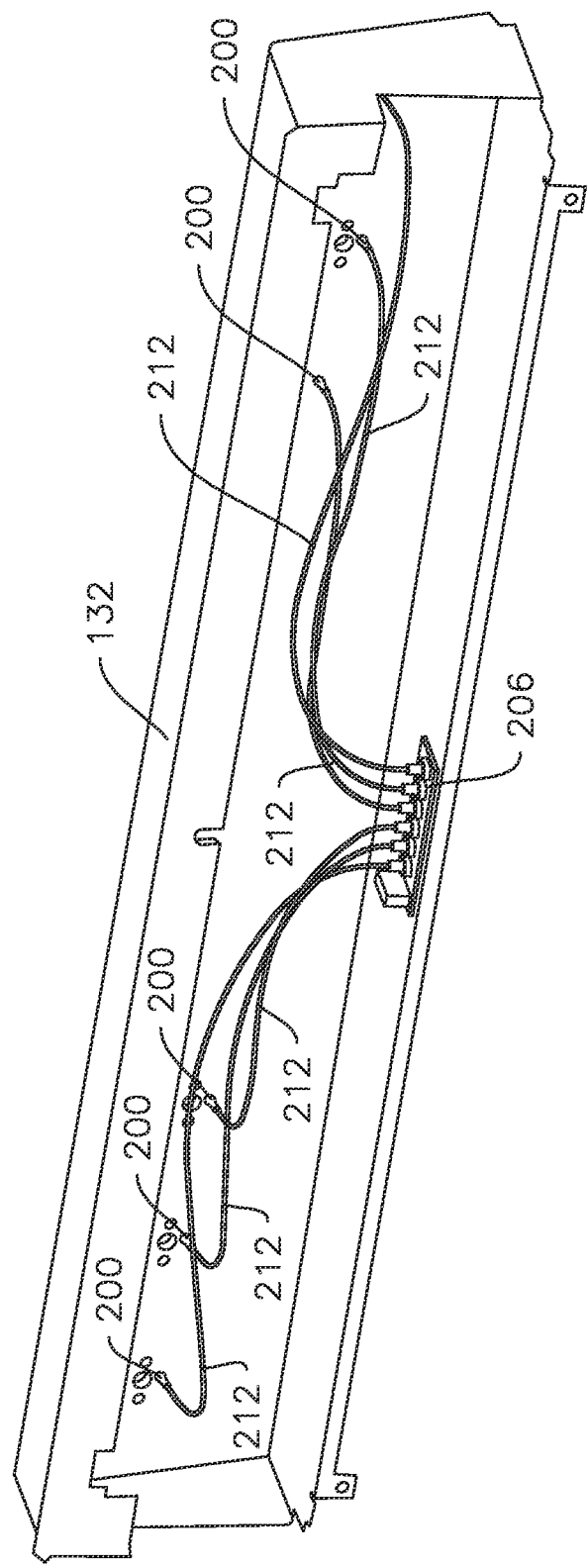
FIG. 8 provides a back perspective view of another exemplary embodiment of the user interface of FIG. 3.
Figure 9:
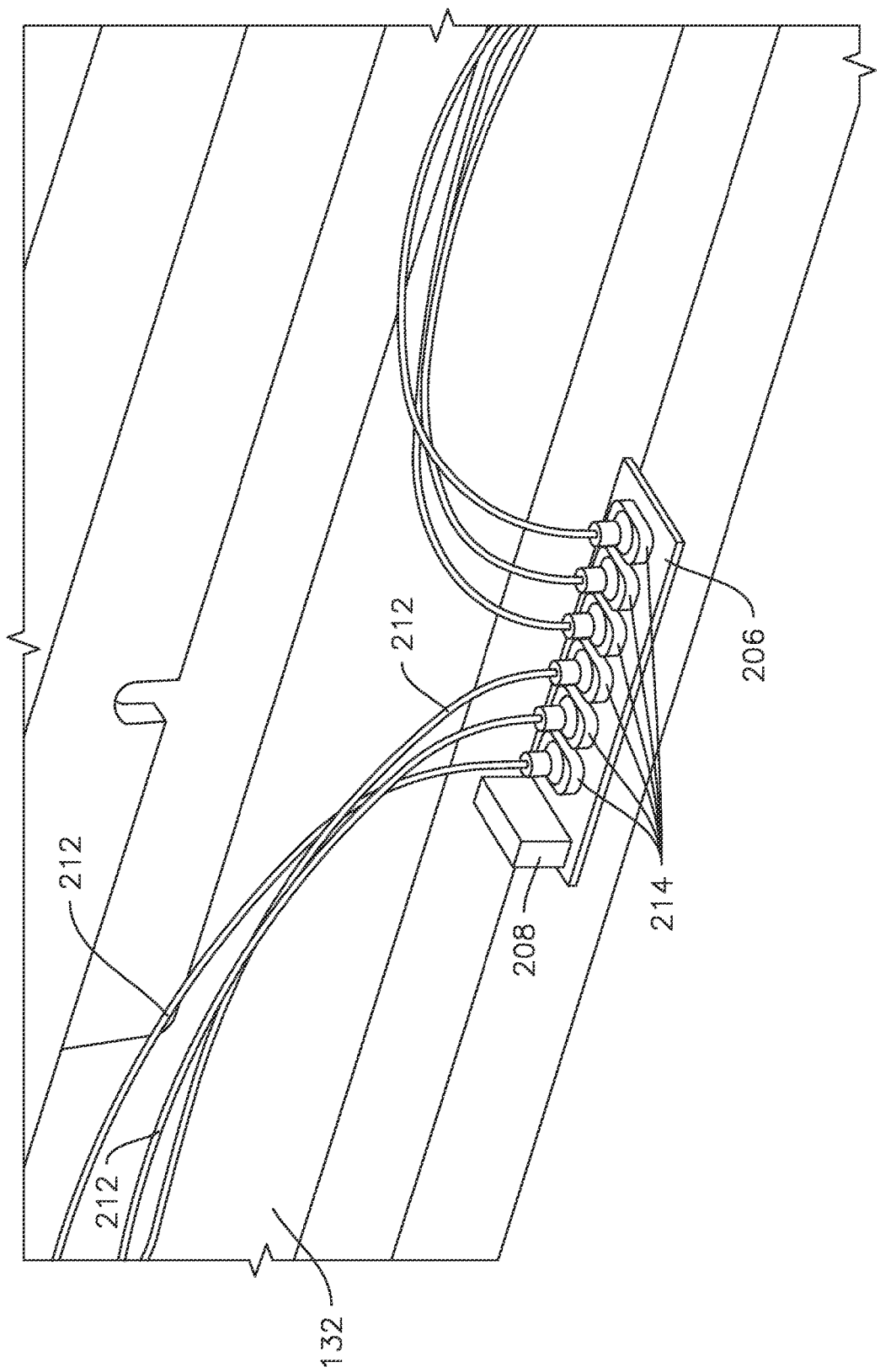
FIG. 9 provides an enlarged view of portions of the user interface of FIG. 8.

In some embodiments, e.g., as illustrated in FIGS. 8 and 9, all of the LEDs 210 for each and every illuminable indicator 200 may be mounted on a single circuit board 206. The flexible lights guides 212 may accommodate such a design by extending from the single, centrally-positioned circuit board 206 to each illuminable indicator 200. Due to the flexible nature of the light guides 212, the flexible light guides 212 may bend or twist in order to reach each illuminable indicator 200 wherever the corresponding illuminable indicator 200 may be located relative to the circuit board or circuit boards 206 on which the LEDs 210 are mounted. As may be seen in FIG. 9 in particular, the flexible light guides 212 may accommodate relatively close spacing of the LEDs 210 on the circuit board 206, e.g., due to the flexible nature of the light guides 212 (or at least a portion 220 of each light guide 212, such as the portion 220 which extends from the shroud 214 to the corresponding illuminable indicator 200) where each flexible light guide 212 may bend at a different degree as may be needed to reach each LED 210.

Figure 10:
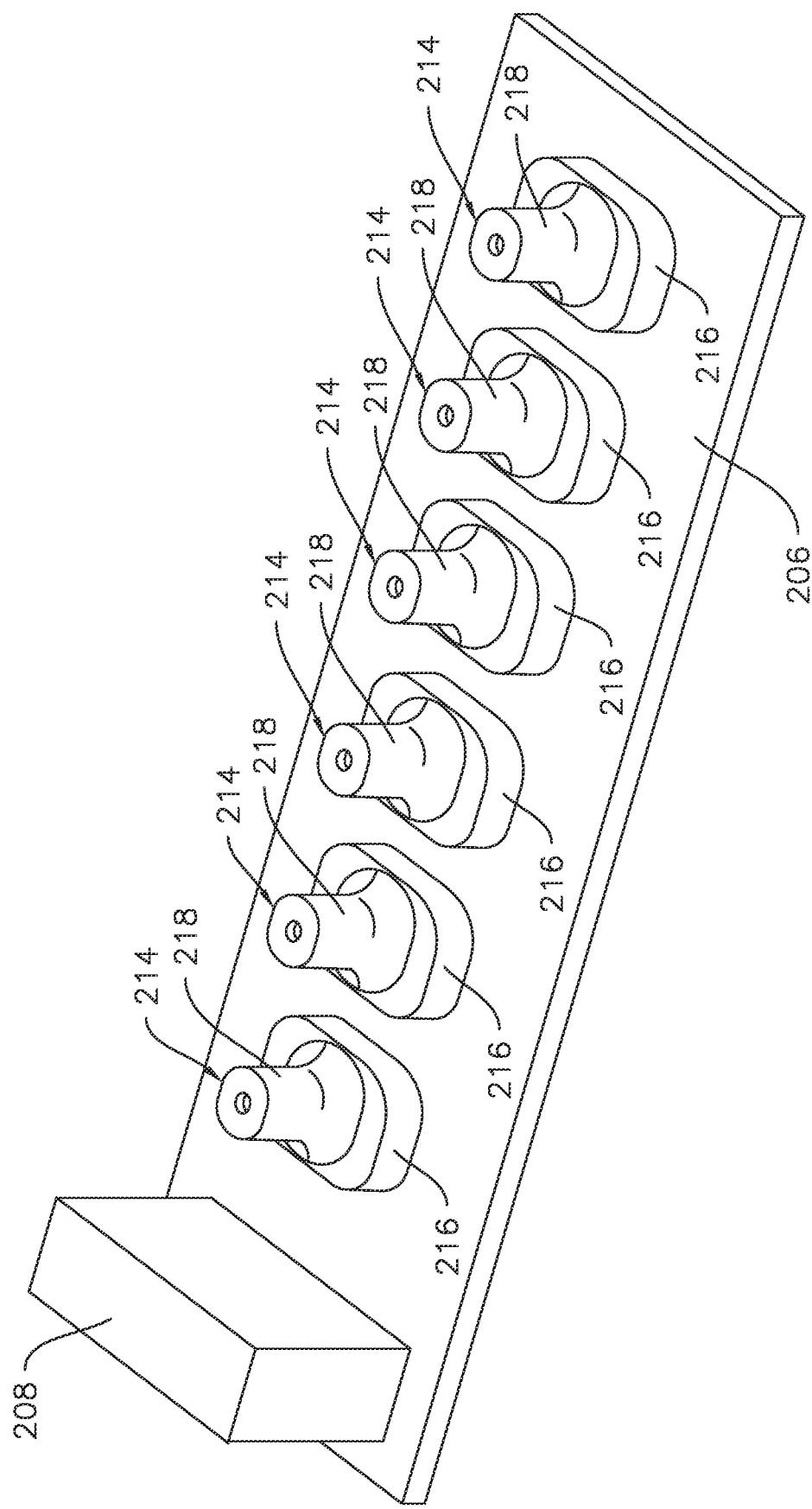
FIG. 10 provides a perspective view of an exemplary circuit board which may be incorporated into a user interface such as the user interface of FIG. 3, and a plurality of shrouds mounted thereto.

FIG. 10 illustrates a plurality of shrouds 214 of a plurality of flexible light guides 212. The shrouds 214 are shown in isolation, e.g., without the remaining, flexible, portion 220 of each light guide 212, in order to more clearly depict the shrouds 214 and portions thereof. In some embodiments, e.g., as illustrated in FIG. 10, each shroud 214 may include a base portion 216 that is directly mounted to the circuit board 206, e.g., is in direct contact with the circuit board 206. The base portion 216 may be generally rectangular and may be configured, e.g., sized and shaped, to fit around the LED 210 (as noted above, the plurality of LEDs 210 are not visible in FIG. 10 because they are surrounded by the shrouds 214) on at least four sides. Each shroud may also include a shaft portion 218 which is connected to the base portion 216 thereof. The shaft portion 218, alone or in combination with the base portion 216, may cover and enclose a front side or top side of the corresponding LED 210. Where the LEDs 210 are mounted on the circuit board 206 at a back or bottom side of each LED 210, each LED 210 is thereby fully enclosed on all sides when the shroud 214 of the respective flexible light guide 212 is coupled to, e.g., mounted on, the circuit board 206 over and around the LED 210.

Figure 11:
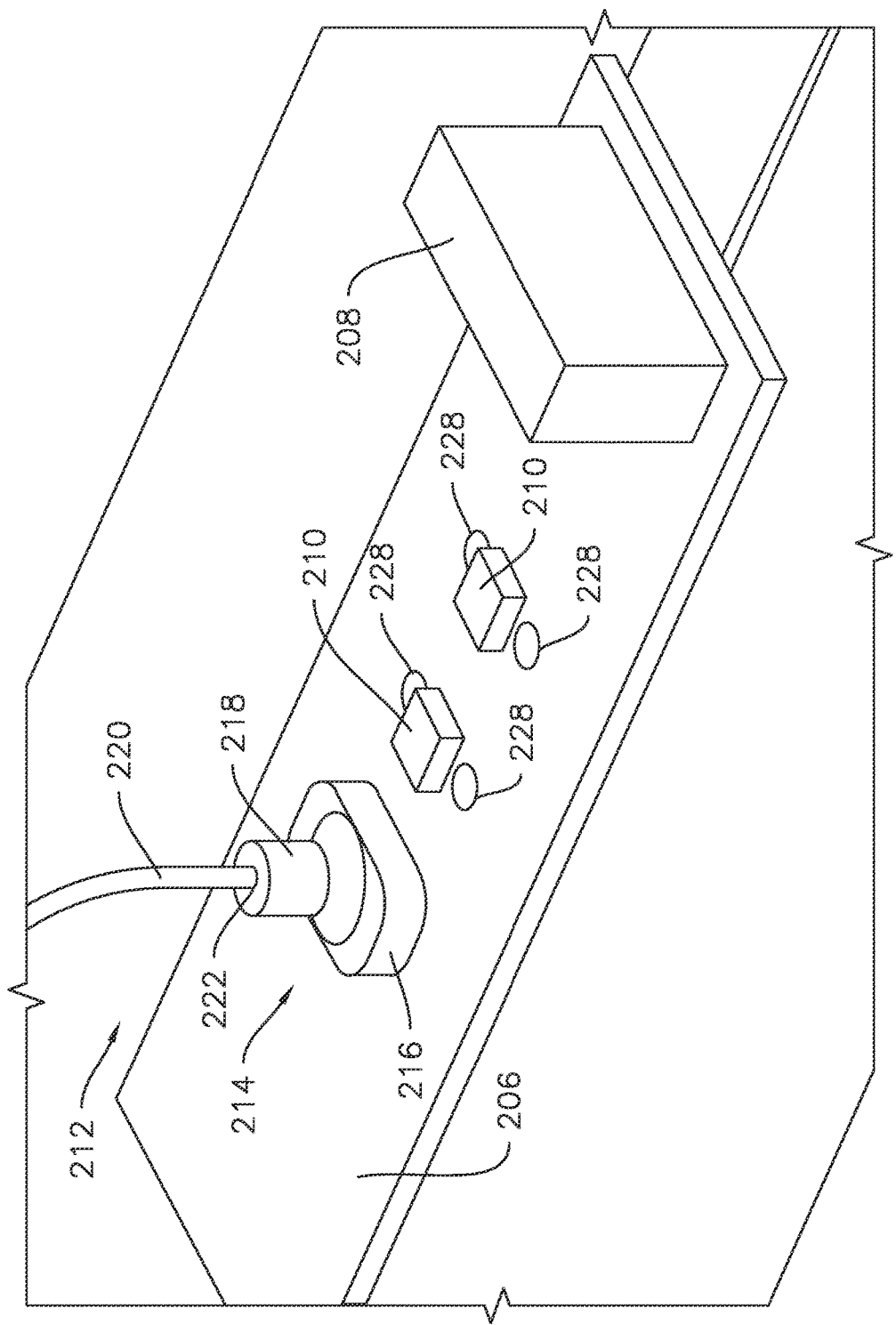
FIG. 11 provides a perspective view of an exemplary circuit board which may be incorporated into a user interface such as the user interface of FIG. 3, with a plurality of LEDs and a shroud mounted thereto.

In some embodiments, e.g., as illustrated in FIG. 11, the circuit board 206 may include one or more thru-holes 228 adjacent each LED 210. The shroud 214 of each flexible light guide 212 may include a matching number of plugs, e.g., two plugs in embodiments such as the example illustrated in FIG. 11 where the circuit board 206 includes two thru-holes 228 for each LED 210, which a received in the thru-holes when the shroud 214 is mounted on the circuit board 206.

Figure 12:
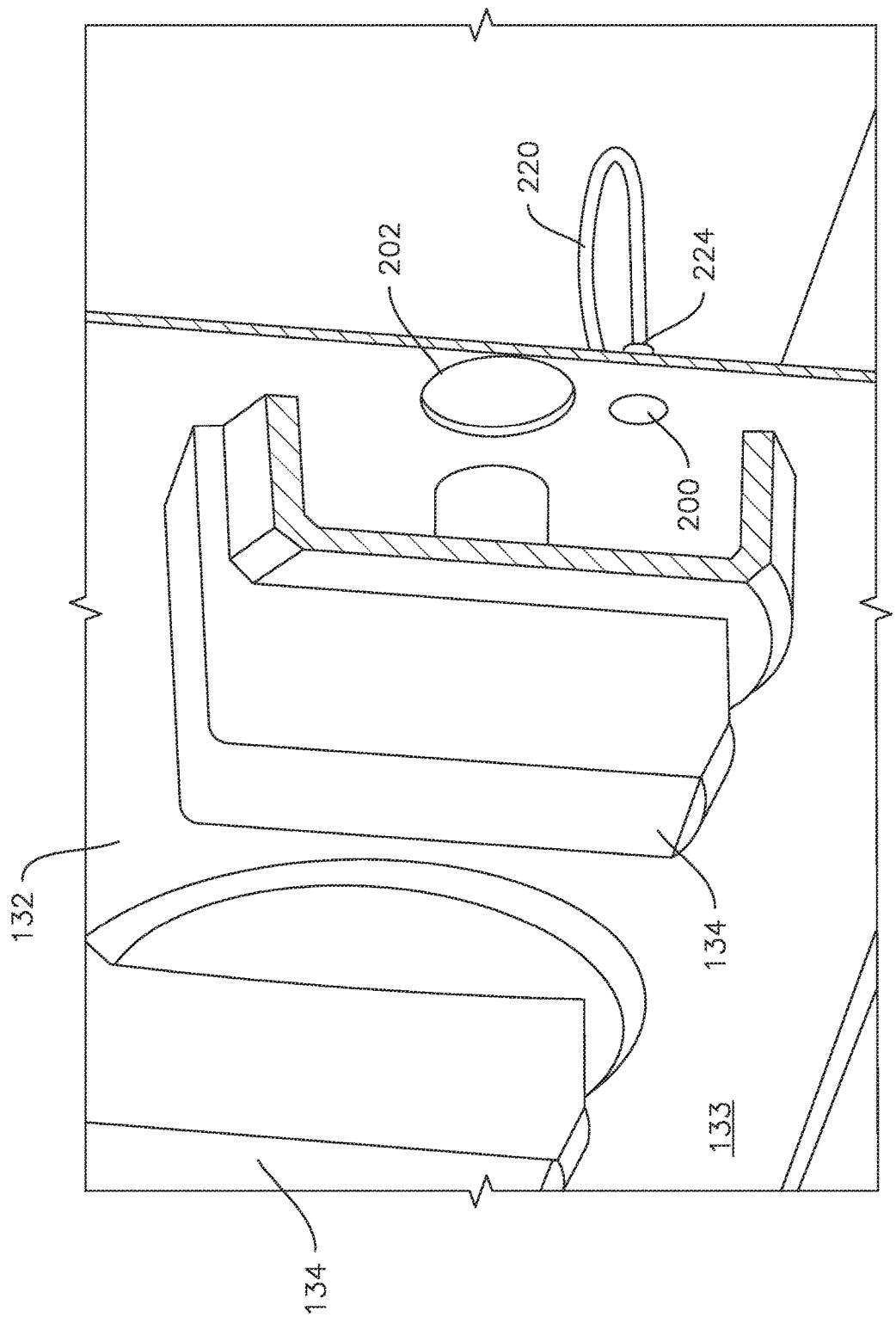
FIG. 12 provides a view of a knob and an illuminable indicator of a user interface according to one or more embodiments of the present subject matter.
Figure 14:
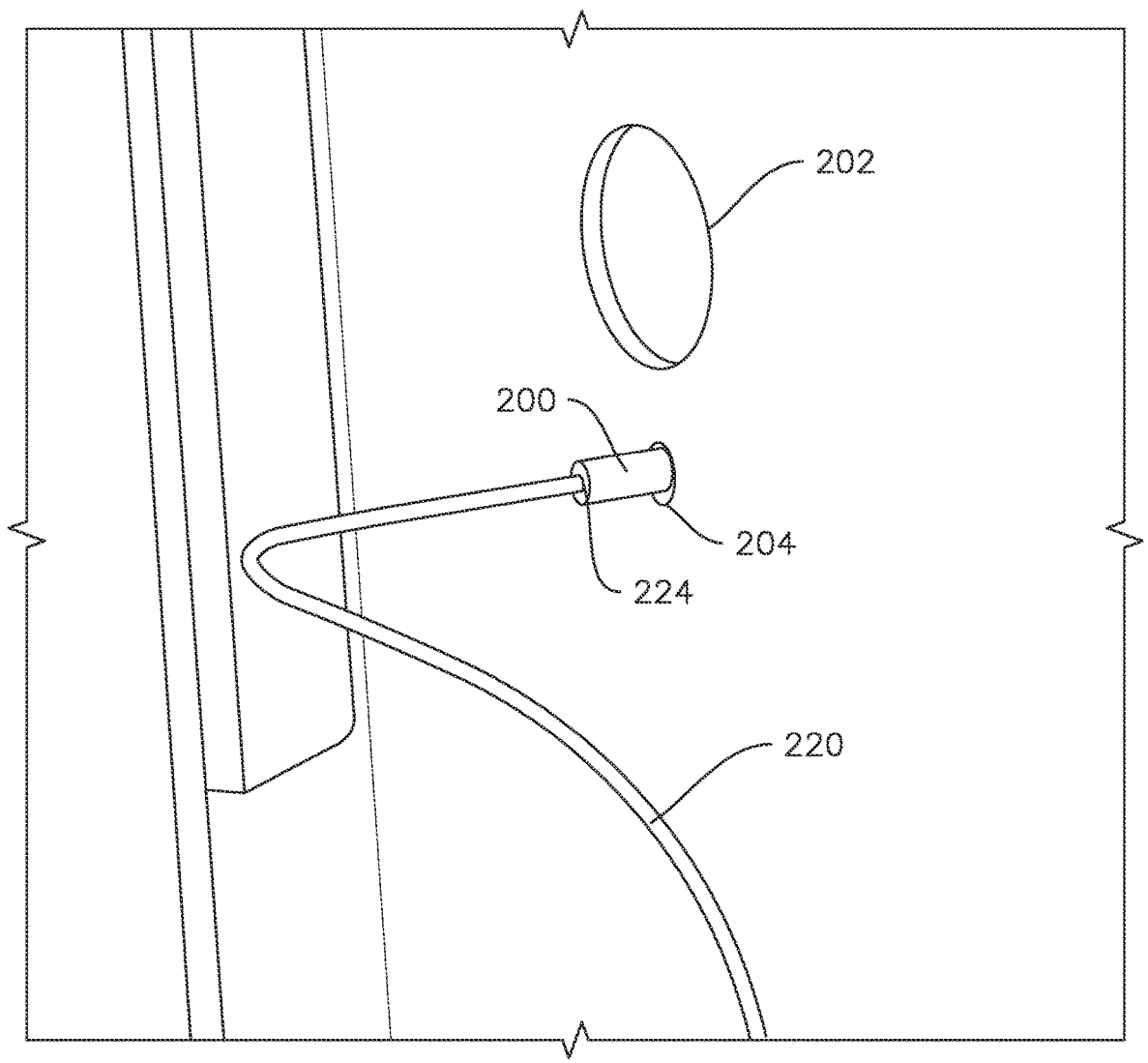
FIG. 14 provides an enlarged perspective view of a back side portion of a user interface according to one or more embodiments of the present subject matter.

As may be seen in FIGS. 11, 12, and 14, each flexible light guide 212 may include a flexible portion 220, e.g., a fiber portion, which includes one or more optical fibers and an opaque coating or jacket surrounding and enclosing the fiber(s) therein. For example, the optical fiber or fibers may comprise a glass material and the opaque jacket may comprise a plastic material. The plastic material may provide optical insulation, e.g., may prevent or limit light bleed or light leaking out from the fiber(s) between the shroud 214 and the illuminable indicator 200, due to the opacity thereof and may provide durability, e.g., increased scratch protection, to the optical fiber(s) within the flexible portion 220 of the flexible light guide 212, such as increased durability in comparison to a bare fiber or bare fibers. The one or more optical fibers may include only a single optical fiber. In various embodiments, the single optical fiber may have a diameter of between about 0.5 mm and about 4 mm, such as between about 1 mm and about 2 mm, such as about 1 mm, or about 2 mm. Still referring to FIGS. 11 and 12, the flexible portion 220 may extend from a first end 222 (FIG. 11) coupled to the shroud 214 of the flexible light guide 212 to a second end 224 (FIGS. 12 and 14) coupled to the corresponding illuminable indicator 200.

FIG. 12 illustrates a section view through the user interface 132 and a control, e.g., knob 134, thereof with the internal input 150 to which the control 134 is coupled omitted to more clearly show the position and configuration of the illuminable indicator 200 and flexible light guide 212 relative to the user interface 132 and knob 134. As may be seen in FIG. 12, the knob 134 may be mounted to the user interface 132. In particular, the knob 134 may be mounted to the user interface 134 such that the knob 134 extends over a footprint on the user interface 134, such as the area of the external surface 133 of the user interface 134 that is located under and/or behind the knob 134. In such embodiments, the illuminable indicator 200 may be positioned within the footprint of the knob 134, e.g., within the area of the external surface 133 of the user interface 132 that is covered by or obscured by the knob 134. In such embodiments, the knob 134 may be at least partially translucent or transparent, such that light from the illuminable indicator 200 is visible through at least a portion of the knob 134. In additional embodiments, the knob 134 may also or instead be backlit, e.g., the light from the illuminable indicator 200 within the footprint of the knob 134 may be visible at and around a perimeter, e.g., diameter, of the knob 134.

Figure 13:
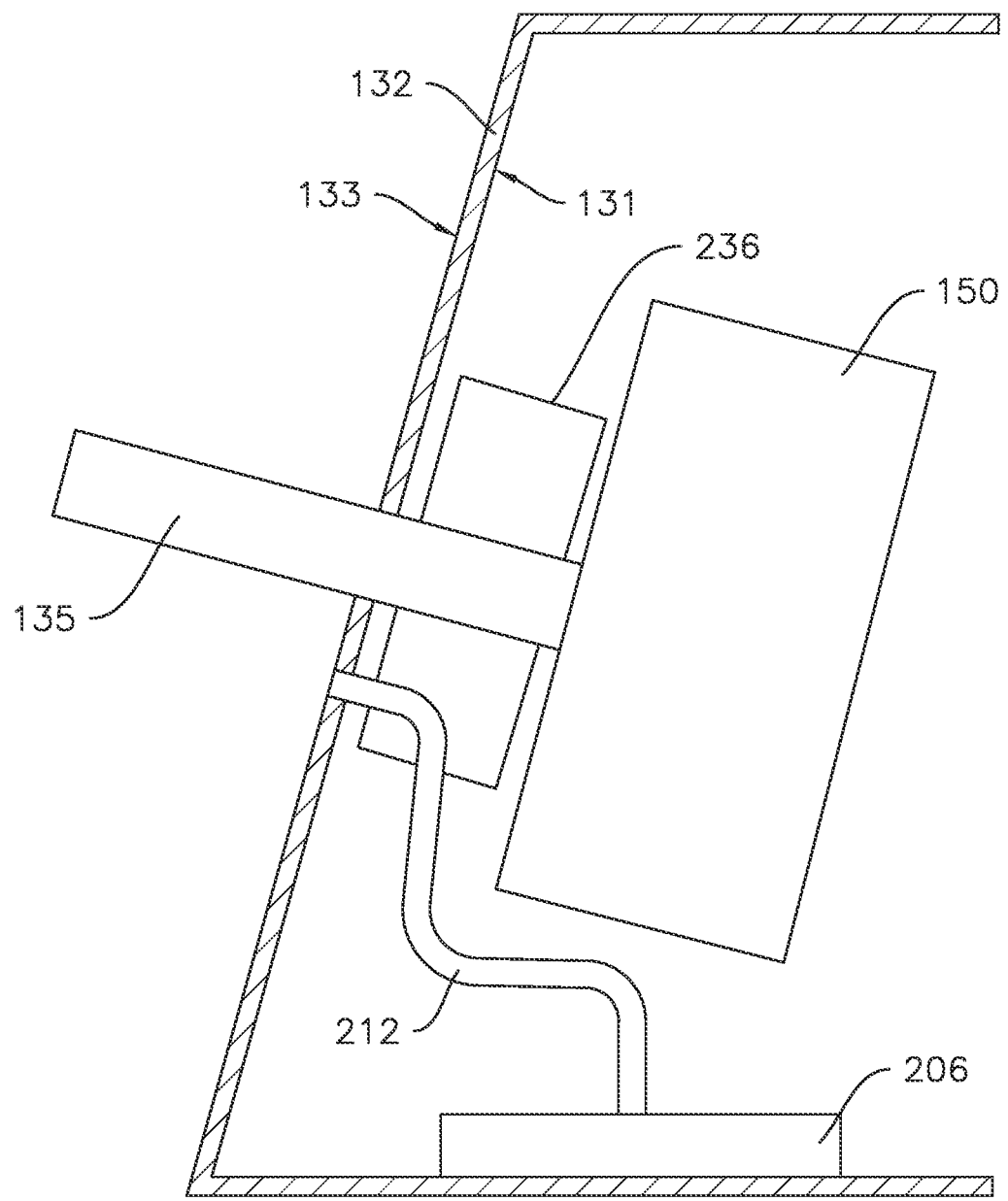
FIG. 13 provides a schematic section view of a user interface according to one or more embodiments of the present subject matter.

In some embodiments, e.g., as illustrated in FIG. 13, the user interface 132 may include the external surface 133 and an opposite, internal surface 131. As described above in context of, for example, FIG. 12, the knob 134 may be mounted to the user interface 132 at the external surface 133 of the user interface 132 (and/or at an external side of the user interface 132 which is closer to the external surface 133 than to the internal surface 131), and the knob 134 may be coupled to an input 150 positioned on an internal side of the user interface 132, such as on a side of the user interface 132 most proximate to the internal surface 131 rather than the external surface 133. In some embodiments, e.g., as illustrated in FIG. 13, the input 150 may be spaced apart from the user interface 132, such as from the internal surface 131 thereof, by a spacer bracket 236. In such embodiments, the flexible light guide 212 may extend through the spacer bracket 236 to the illuminable indicator 200.

Figure 15:
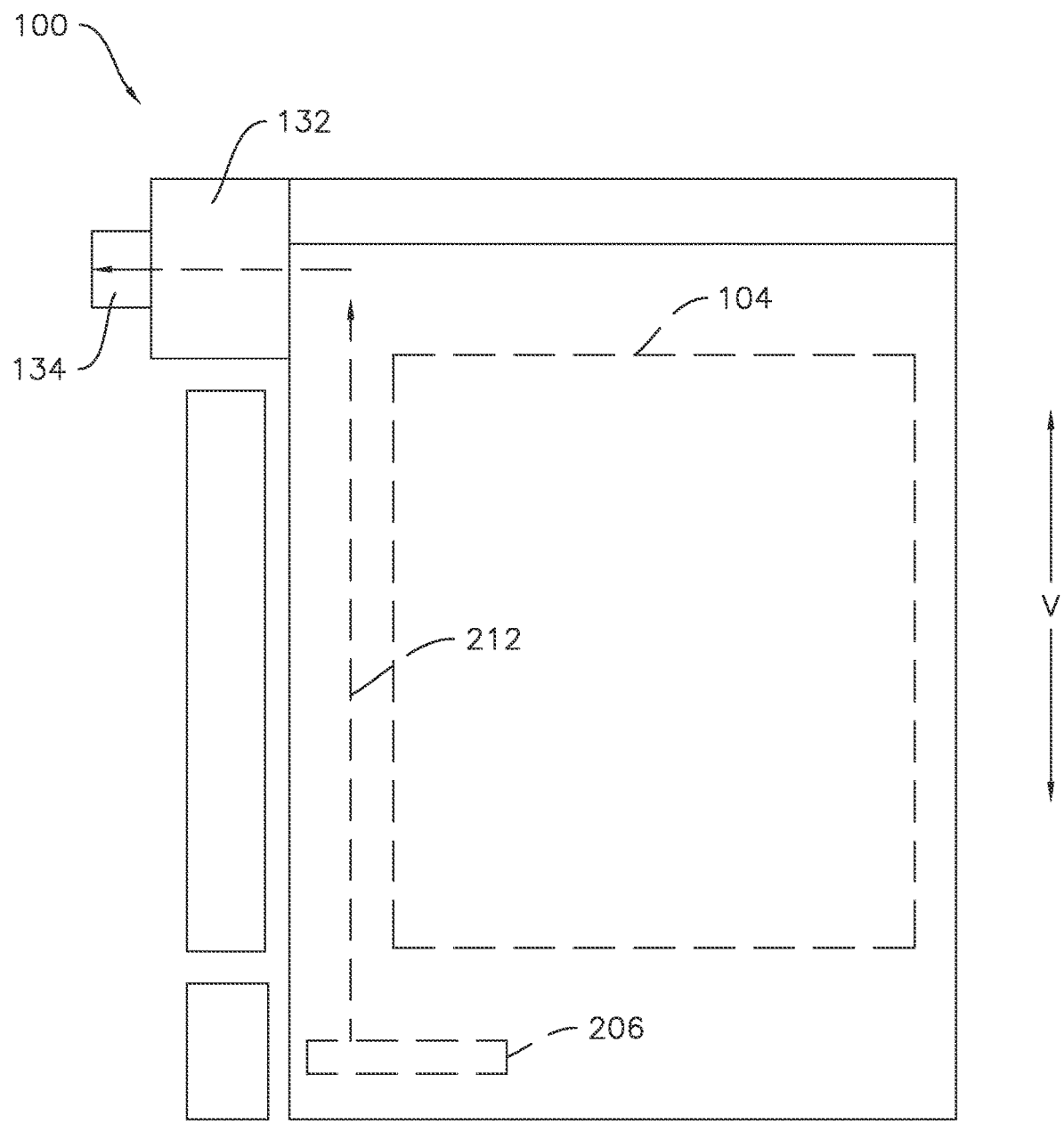
FIG. 15 provides a schematic view of an exemplary appliance according to one or more embodiments of the present subject matter.

FIG. 15 provides a schematic illustration of an appliance having a user interface 132 and a circuit board 206 in accordance with one or more embodiments of the present disclosure. In various embodiments, the circuit board 206 may be spaced apart from the user interface 132. For example, the flexible light guides 212 may permit optical coupling of one or more illuminable indicators 200 on the user interface 132 with one or more respective LEDs 210 on the circuit board 206 without requiring the circuit board to be positioned adjacent to the user interface 132 or aligned along a straight line with the user interface 132. Accordingly, numerous variation in the size, number, and position of circuit boards 206 optically coupled to the user interface 132 are possible within the scope of the present disclosure including the flexible light guides 212. For example, in some embodiments, the circuit board 206 may be spaced apart from the user interface 132 and on an opposite side of one or more other intervening components of the appliance from the user interface 132. In such embodiments, the appliance may be an oven appliance, such as the oven appliance 100 shown and described herein. Thus, in some exemplary embodiments where the appliance is an oven appliance, the user interface 132 may be positioned above the cooking chamber 104 while the circuit board 206 is positioned opposite the user interface 132, e.g., below the cooking chamber 104. Positioning the circuit board 206 below the cooking chamber 104 may advantageously protect the circuit board from higher temperatures due to heat from the cooking chamber 104, while positioning the user interface 132 above the cooking chamber 104 may advantageously provide a more convenient, e.g., more accessible, location for the user interface 132.

Those of ordinary skill in the art will recognize that flexible light guides as disclosed herein provide numerous advantages over the prior art. For example, the flexibility of the light guide may provide increased performance, e.g., light transmission, across various installation conditions. In particular, when manufacturing tolerances, such as multiple assembly tolerance stack-ups that may occur in the multi-part assembly, result in misalignment of the circuit board and the user interface, the optical fibers of the flexible light guide still transmit light, in contrast to a rigid light guide which is dependent on the circuit board and the user interface being at an angle with each other that is within a narrow range in order to provide optimal light transmission. The foregoing is by way of example only, the manufacturing tolerances described herein may not necessarily be present, and the flexible light guide of the present disclosure may also or instead provide other advantages, as will be understood by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An appliance, comprising:
    a cabinet;
    a user interface disposed on a front side of the cabinet, the user interface comprising an illuminable indicator mounted to an external surface of the user interface;
    a circuit board;
    an LED mounted on the circuit board; and
    a flexible light guide extending from the LED to the illuminable indicator, whereby the flexible light guide provides optical communication from the LED to the illuminable indicator, whereby the LED is operable to illuminate the illuminable indicator when the LED is activated, the flexible light guide comprising a shroud mounted to the circuit board over and around the LED whereby the LED is fully enclosed by and between the shroud and the circuit board, the flexible light guide further comprising a flexible portion extending from a first end of the flexible portion coupled to the shroud to a second end of the flexible portion directly contacting and coupled to the illuminable indicator.

2. The appliance of claim 1, wherein the LED is a first LED, further comprising a second LED mounted on the circuit board adjacent to the first LED.

3. The appliance of claim 2, wherein the shroud of the flexible light guide surrounds the first LED whereby the first LED is optically isolated from the second LED.

4. The appliance of claim 2, wherein the flexible light guide is a first flexible light guide, further comprising a second flexible light guide extending from the second LED.

5. The appliance of claim 1, wherein the appliance is an oven appliance comprising a cooking chamber defined within the cabinet for receipt of food items for cooking, wherein the circuit board is positioned below the cooking chamber.

6. The oven appliance of claim 5, wherein the user interface is positioned above the cooking chamber.

7. The appliance of claim 1, wherein the circuit board is spaced apart from the user interface.

8. The appliance of claim 1, wherein the flexible light guide comprises a single optical fiber.

9. The appliance of claim 1, further comprising a knob mounted to the user interface, the knob extending over a footprint on the user interface, wherein the illuminable indicator is positioned within the footprint of the knob.

10. The appliance of claim 1, further comprising a knob mounted to the user interface at the external surface of the user interface, the knob coupled to an input positioned on an internal side of the user interface, the input spaced apart from the user interface by a spacer bracket, wherein the flexible light guide extends through the spacer bracket to the illuminable indicator.

11. An appliance, comprising:
    a cabinet;
    a user interface comprising an illuminable indicator;
    a circuit board;
    an LED mounted on the circuit board; and
    a flexible light guide extending from the LED to the illuminable indicator, whereby the flexible light guide provides optical communication from the LED to the illuminable indicator, whereby the LED is operable to illuminate the illuminable indicator when the LED is activated, the flexible light guide comprising a shroud mounted to the circuit board over and around the LED whereby the LED is fully enclosed by and between the shroud and the circuit board, the flexible light guide further comprising a flexible portion extending from a first end of the flexible portion coupled to the shroud to a second end of the flexible portion directly contacting and coupled to the illuminable indicator.

12. The appliance of claim 11, wherein the LED is a first LED, further comprising a second LED mounted on the circuit board adjacent to the first LED.

13. The appliance of claim 12, wherein the shroud of the flexible light guide surrounds the first LED whereby the first LED is optically isolated from the second LED.

14. The appliance of claim 12, wherein the flexible light guide is a first flexible light guide, further comprising a second flexible light guide extending from the second LED.

15. The appliance of claim 11, wherein the appliance is an oven appliance comprising a cooking chamber defined within the cabinet for receipt of food items for cooking, wherein the circuit board is positioned below the cooking chamber.

16. The oven appliance of claim 15, wherein the user interface is positioned above the cooking chamber.

17. The appliance of claim 11, wherein the circuit board is spaced apart from the user interface.

18. The appliance of claim 11, wherein the flexible light guide comprises a single optical fiber.

19. The appliance of claim 11, further comprising a knob mounted to the user interface, the knob extending over a footprint on the user interface, wherein the illuminable indicator is positioned within the footprint of the knob.

20. The appliance of claim 11, further comprising a knob mounted to the user interface at an external side of the user interface, the knob coupled to an input positioned on an internal side of the user interface, the input spaced apart from the user interface by a spacer bracket, wherein the flexible light guide extends through the spacer bracket to the illuminable indicator.

* * * * *